(12) United States Patent
Lee et al.

(10) Patent No.: US 8,496,376 B2
(45) Date of Patent: Jul. 30, 2013

(54) DUAL SOURCE AUTO-CORRECTION IN DISTRIBUTED TEMPERATURE SYSTEMS

(75) Inventors: Chung Lee, Austin, TX (US); Kwang Suh, Lakeway, TX (US)

(73) Assignee: SensorTran, Inc., Austin, TX (US)

( * ) Notice: Subject to any disclaimer, the term of this patent is extended or adjusted under 35 U.S.C. 154(b) by 569 days.

(21) Appl. No.: 12/451,865

(22) PCT Filed: Jul. 7, 2008

(86) PCT No.: PCT/US2008/008317
§ 371 (c)(1),
(2), (4) Date: Dec. 3, 2009

(87) PCT Pub. No.: WO2009/011766
PCT Pub. Date: Jan. 22, 2009

(65) Prior Publication Data
US 2010/0128756 A1    May 27, 2010

Related U.S. Application Data

(60) Provisional application No. 60/959,931, filed on Jul. 18, 2007.

(51) Int. Cl.
*G01K 15/00* (2006.01)
*G01K 11/00* (2006.01)
*G01K 3/00* (2006.01)
*G01J 5/00* (2006.01)

(52) U.S. Cl.
USPC .............. 374/161; 374/1; 374/130; 374/121; 374/137; 374/124

(58) Field of Classification Search
USPC ............ 374/161, 1, 130, 121, 137, 124
See application file for complete search history.

(56) References Cited

U.S. PATENT DOCUMENTS

| | | | |
|---|---|---|---|
| 4,673,299 | A | 6/1987 | Dakin |
| 4,767,219 | A | 8/1988 | Bibby |
| 4,859,065 | A | 8/1989 | Bibby |
| 5,981,957 | A | 11/1999 | Cruce |
| 6,606,148 | B2 | 8/2003 | Fredin |
| 7,057,714 | B2 | 6/2006 | Fredin |
| 7,350,972 | B2 | 4/2008 | Seebacher |
| 7,389,011 | B2 * | 6/2008 | Ogura et al. .................. 385/12 |
| 2005/0140966 | A1 | 6/2005 | Yamate |
| 2007/0165691 | A1 * | 7/2007 | Taverner et al. ............. 374/120 |
| 2007/0223556 | A1 | 9/2007 | Lee |
| 2009/0252193 | A1 * | 10/2009 | Hill et al. .......................... 374/1 |
| 2011/0231135 | A1 * | 9/2011 | Suh et al. ....................... 702/99 |

FOREIGN PATENT DOCUMENTS

WO    WO2008047329 A2    4/2008

* cited by examiner

*Primary Examiner* — Mirellys Jagan
(74) *Attorney, Agent, or Firm* — Michael A. Ervin; John W. Wustenberg; Krueger Iselin LLP

(57) ABSTRACT

An automatic and continuous method is presented to improve the accuracy of fiber optic distributed temperature measurements derived from Raman back scatterings utilizing two light sources with different wavelengths, by choosing the wavelengths of the two sources so the primary source's return anti-Stokes component overlaps with the incident wavelength of the secondary light source thereby canceling out the non-identical attenuations generated by the wavelength differences between Stokes and anti-Stokes bands.

3 Claims, 8 Drawing Sheets

DUAL SOURCE AUTO-CORRECTION IN DISTRIBUTED TEMPERATURE SYSTEMS

CROSS REFERENCE TO RELATED APPLICATIONS

This application claims the benefit of U.S. provisional Ser. No. 60/959,931, filed Jul. 18, 2007 by the present inventors.

FIELD OF THE INVENTION

The present invention relates generally to temperature sensing, and more particularly, to dual source self-calibration systems and methods for distributed temperature sensing.

BACKGROUND OF THE INVENTION

Fiber optic Distributed Temperature Sensing (DTS) systems developed in the 1980s to replace thermocouple and thermistor based temperature measurement systems. DTS technology is based on Optical Time-Domain Reflectometry (OTDR) and utilizes techniques originally derived from telecommunications cable testing. Today DTS provides a cost-effective way of obtaining hundreds, or even thousands, of highly accurate, high-resolution temperature measurements, DTS systems today find widespread acceptance in industries such as oil and gas, electrical power, and process control.

The underlying principle involved in DTS-based measurements is the detection of spontaneous Raman back-scattering. A DTS system launches a primary laser pulse that gives rise to two back-scattered spectral components. A Stokes component that has a lower frequency and higher wavelength content than the launched laser pulse, and an Anti-Stokes component that has a higher frequency and lower wavelength than the launched laser pulse. The Anti-Stokes signal is usually an order of magnitude weaker than the Stokes signal (at room temperature) and it is temperature sensitive, whereas the Stokes signal is almost entirely temperature independent. Thus, the ratio of these two signals can be used to determine the temperature of the optical fiber at a particular point. The time of flight between the launch of the primary laser pulse and the detection of the back-scattered signal may be used to calculate the special location of the scattering event within the fiber.

One problem involved in the operation of DTS systems is proper calibration. DTS technology derives temperature information from two back-scattered signals that are in different wavelength bands. The shorter wavelength signal is the Raman anti-Stokes signal, the longer one is usually the Raman Stokes signal. After the light from the primary source at $\lambda_1$ is launched in a temperature sensing fiber, the scattered power arising from different locations within the optical fiber contained in the Stokes ($\lambda_1^{Stokes}$) and anti-Stokes ($\lambda^{Anti-Stokes}$) bands travel back to the launch end and gets detected by single or multiple detectors. As the Stokes and anti-Stokes signals travel, they suffer different attenuation profiles $\alpha^{Stokes}$ and $\alpha^{Anti-Stokes}$ respectively, due to the difference in the wavelength band for these two signals. For proper temperature measurement a correction needs to be made so that the two signals exhibit the same attenuation.

One approach that has been used is to assume that the attenuation profile is exponentially decaying as a function of distance. This creates an exponential function with an exponent called the Differential Attenuation Factor (DAF) that is multiplied by the Stokes signal to adjust the attenuation profile to that of the anti-Stokes signal. The ratio of the resulting two signals is then used to derive temperature. The DAF is the difference in attenuation ($\alpha_{AS}$-$\alpha_S$) between two different wavelengths.

The assumption of a smooth exponential decay however is not always a reality. A number of factors can cause the actual attenuation to deviate from the exponential form. Localized mechanical stress or strain, fiber crimping, chemical attack (eg. hydrogen ingression) all can induce abnormalities, and some of these can change with time. It has been recognized in the industry that some form of continuous calibration is needed to reduce all of these irregularities.

U.S. Pat. No. 7,126,680 B2, Yamate et al. proposed using two additional light sources—one in the Stokes band of the primary source and the other in the anti-Stokes band of the primary source—to generate Rayleigh OTDR signals and time-correct the attenuation profile of the back-scattered signals. Therefore, Yamate et al. effectively propose removing the attenuation component from the back-scattered availability of desired light sources or the issue of cost have been obstacles to a practical implementation.

Some single source methods have been proposed in the past using Rayleigh and anti-Stokes bands (Farries—UK patent GB2183821—1987). One of the current inventors proposed a dual source approach in U.S. application Ser. No. 11/685,637. Each of these schemes have fairly slow response and are not fully automatic.

Double ended configurations (both ends of sensing fiber connected to DTS unit to cancel out common attenuations) have been used. These may double the length of sensing fiber and the sensing time, require an extra monitoring channel, and are not universally applicable in applications where space is limited.

BRIEF SUMMARY OF THE INVENTION

There is a need then for a simpler and fully automatic correction method. The present invention provides this with dual-source self-calibration systems and methods for distributed temperature sensing. More specifically, a dual source configuration comprising a primary and secondary source is used in which the secondary source wavelength approximately coincides with the Anti-Stokes Raman wavelength of the primary source. This aspect of the inventive concept allows accurate temperature monitoring without the need to handle differential attenuation after deployment of the sensing fiber.

In one embodiment, a method of auto-corrected temperature measurement using a fiber optic distributed sensor includes at least of the steps of: injecting primary light energy into a sensor fiber using a primary light source; collecting back-scattered light energy at the Raman anti-Stokes wavelength of the primary light energy and measuring its intensity; injecting secondary light energy into the same sensing fiber at the Raman anti-Stokes wavelength of the primary light energy using a secondary light source; collecting back-scattered light energy at the Raman Stokes wavelength of the secondary light energy and measuring its intensity; and calculating a temperature using the back-scattered anti-Stokes signal of the primary light energy and the back-scattered Stokes signal of the secondary light energy.

In another embodiment, there is a system of self-calibrated temperature measurement using a fiber optic distributed sensor including at least: a distributed fiber optic sensor; a primary light source for providing a back-scattered anti-Stokes band from said distributed fiber optic sensor; a secondary light source with a wavelength chosen to coincide with said back-scattered anti-Stokes band provided by said primary light source, said secondary light source providing a back-scattered Stokes band from said distributed fiber optic sensor; an optical switch for selecting between said primary and secondary light sources; wherein the system calibrates and measures the temperature distribution along said distributed fiber optic sensor based on the ratio of the anti-Stokes band of the primary light source and the Stokes band of the secondary light source.

In another embodiment of the inventive concept there is a method for self-calibrated temperature measurement using fiber optic distributed sensor including at least the steps of: injecting primary light energy into a sensor fiber using a primary light source; collecting back-scattered light energy at the Raman Stokes wavelength of the primary light source and measuring its intensity; injecting secondary light energy into the fiber at the Raman anti-Stokes wavelength of the primary light source using a secondary light source; collecting back-scattered light energy at the Raman Stokes wavelength of the secondary light source and measuring its intensity; calculating a ratio between the back-scattered Stokes signal of the primary light source and the back-scattered Stokes signal of the secondary light source to produce an Attenuation Correction Factor at one or more positions along the sensor fiber; and adjusting a temperature measured by the fiber optic distributed temperature sensor using the Attenuation Correction Factor. In this method the temperature measurement and calculation is made by injecting primary light energy into said sensor fiber using a primary light source; collecting back-scattered light energy at the Raman anti-Stokes wavelength of the primary light source and measuring its intensity; collecting back-scattered light energy at the Raman Stokes wavelength of the primary light source and measuring its intensity; and calculating a ratio between the intensities of the back-scattered Raman anti-Stokes and Stokes wavelengths.

BRIEF DESCRIPTION OF THE SEVERAL VIEWS OF THE DRAWINGS

For a more complete understanding of the present invention, reference is now made to the following drawings, in which.

DETAILED DESCRIPTION OF THE INVENTION

In the following detailed description, reference is made accompanying drawings that illustrate embodiments of the present invention. These embodiments are described in sufficient detail to enable a person of ordinary skill in the art to practice the invention without undue experimentation. It should be understood, however, that the embodiments and examples described herein are given by way of illustration only, and not by way of limitation. Various substitutions, modifications, additions, and rearrangements may be made without departing from the spirit of the present invention. Therefore, the description that follows is not to be taken in a limited sense, and the scope of the present invention is defined only by the appended claims.

Figure 1:
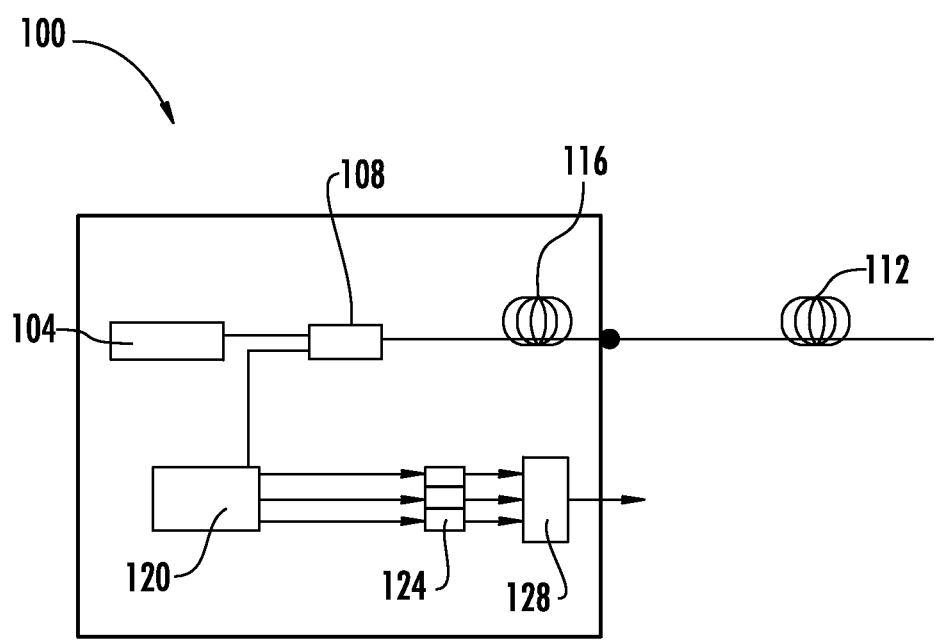
FIG. 1 shows a block diagram of a prior art DTS system.

Turning now to FIG. 1, a prior art single source DTS system, shown generally by the numeral 100 is depicted. In operation, a pulsed laser light having a wavelength $\lambda_1$ is generated by primary laser source 104 and it is fed to sensing optical fiber 112 through optical combiner/splitter 108. An internal reference fiber coil 116 is located within the DTS and is maintained at a known temperature $\theta$. Light is back-scattered as the pulse propagates through fiber 112, owing to changes in density and composition as well as to molecular and bulk vibrations. In a homogeneous fiber, the intensity of the back-scattered light decays exponentially with time.

Because the velocity of light propagation in optical fiber 112 is well known, the distance may be determined from the time-of-flight of the returning back-scattered light. The back-scattered light reaches optical combiner/splitter 108 and comprises different spectral components due to different interaction mechanisms between the propagating light pulse and the optical fiber. Back-scattered spectral components include Rayleigh, Brillouin, and Raman peaks or bands. Optical combiner/splitter 108 directs these mixed spectral components to optical filter 120, which separates the back-scattered components into the bands of interest, which may be the Rayleigh, Raman Stokes and Raman Anti-Stokes wavelengths and then feeds them into necessary photo-detectors 124. Three photo detectors are shown for illustrative purposes. The signals from photo-detectors are fed to a programmed signal processor that outputs temperature as a function of location along sensing fiber 112.

The Rayleigh backscattering component ($\lambda_R$) is the strongest signal and has the same wavelength as primary laser pulse $\lambda_1$. As such, the Rayleigh component controls the main slope of the intensity decay curve and may be used to identify the breaks and heterogeneities along the fiber. The Rayleigh component is not sensitive to temperature, i.e., is temperature independent.

The Brillouin backscattering components are caused by lattice vibrations from the propagating light pulse. However, these peaks are spectrally so close to the primary laser pulse that it is difficult to separate the Brillouin components from the Rayleigh signal.

The Raman backscattering components are caused by thermally influenced molecular vibrations from the propagating light pulse. Thus, their intensities depend on temperature. The Raman back-scattered light has two components that lie symmetric to the Rayleigh peak: the Stokes peak ($\lambda_S$) and the anti-Stokes peak ($\lambda_{AS}$).

The intensity ($I_{AS}$) of the anti-Stokes peak is typically lower than the intensity ($I_S$) of the Stokes peak, but is strongly related to temperature, whereas the intensity of the Stokes peak is only weakly related to temperature. By calculating a ratio of the anti-Stokes to Stokes signal intensities, an accurate temperature measurement can be obtained. Combining this temperature measurement technique with distance measurement through time-of-flight of light, the DTS system may provide temperature measurements incrementally along the entire length of optical fiber 112.

In a typical single light source Raman DTS system, the temperature is measured by the intensity ratio R(T) between anti-Stokes ($I_{AS}$) and Stokes ($I_S$) signals, the temperature information can be obtained according to Equation 1:

$$R(T) = \frac{I_{AS}}{I_S} = \left(\frac{\lambda_S}{\lambda_{AS}}\right)^4 \cdot \exp\left(-\frac{hc\upsilon}{kT}\right) \qquad \text{Eq. (1)}$$

where $\lambda_{AS}$ and $\lambda_{AS}$ are the Stokes and anti-Stokes wavelengths, u is their wave number separation from the input wavelength $\lambda_1$, h is Planck's constant, c is the velocity of the light, k is Boltzmann's constant, and T is the absolute temperature of the fiber core under measurement.

The input signal travels along the fiber to the measurement location and the scattered signals travel back to a detector, which adds to the back-scattered signals the attenuation effect in both directions. Further, there is a slight difference in attenuation factor between anti-Stokes signal and Stokes signal due to the difference in wavelength while traveling back from the measurement point to the detector. Aside from the non-linear effects, optical fibers generally exhibit higher attenuation for shorter wavelength, and therefore, anti-Stokes signals usually have higher attenuation than Stokes signals. As a result, with the assumption that the optical signals attenuate exponentially along fiber 103, Equation 1 may be modified to take the effect of fiber-induced attenuation as follows:

$$R(T) = \frac{I_{AS}}{I_S} = \left(\frac{\lambda_S}{\lambda_{AS}}\right)^4 \cdot \exp\left(-\frac{hc\upsilon}{kT}\right) \cdot \exp[l \cdot (\alpha_{AS} - \alpha_S)] \qquad \text{Eq. 2}$$

where l is the length of the fiber that the signals have traveled, and $\alpha_{AS}$ and $\alpha_S$ are the attenuation factors in anti-Stokes and Stokes wavelength, respectively.

Before using the equations to derive the temperature, the differential attenuation induced component may be removed. The typical method is to move the $(\alpha_{AS}-\alpha_S)$ $$\frac{AS}{S \cdot \exp(l \cdot DAF)} = \left(\frac{\lambda_S}{\lambda_{AS}}\right)^4 \cdot \exp\left(-\frac{hc\upsilon}{kT}\right) \qquad \text{Eq. 3}$$

factor (referred to as differential attenuation factor or DAF) to the left side of Equation 2. The DAF may be predetermined for a given fiber type, and the temperature then may be derived by multiplying the Stokes data by a DAF-induced exponential factor:

This operation is based on the assumption that the attenuation profiles of all optical signals traveling along the fiber are exponentially decaying as a function of the distance. Although this is generally true with most optical fibers in good physical condition, physical stress/strain, extremely high/low temperature, and/or hydrogen ingression may cause the attenuation profile of the back-scattered signals to deviate from the originally measured and calibrated form. In such cases, a single static DAF based correction factor may no longer be sufficiently accurate or effective.

Figure 2:
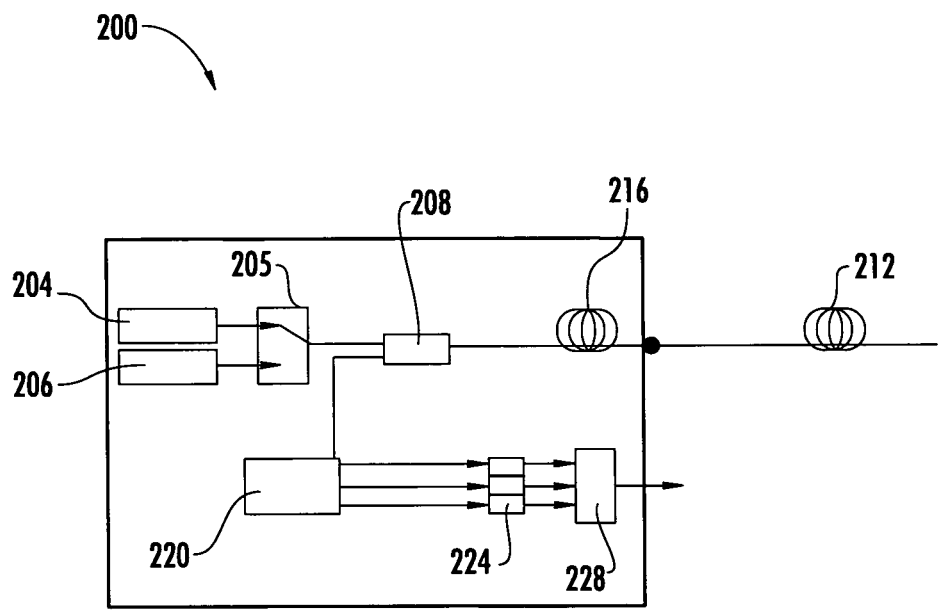
FIG. 2 shows a block diagram of a DTS system configured for a dual light calibration.
Figure 3:
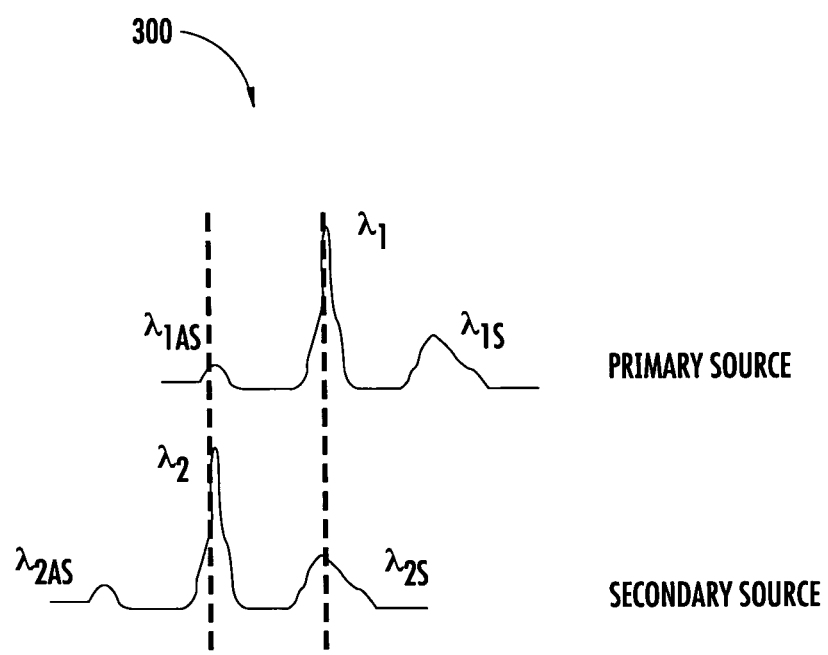
FIG. 3 illustrates the choice of primary and secondary light sources.

FIG. 2, shown generally as the numeral 200 shows a block diagram of an alternate DTS system capable of performing a self-calibration method according to an embodiment of the present invention. Primary light source 204 (wavelength $\lambda_1$) and secondary light source 206 (wavelength $\lambda_2$) may alternatively feed primary and secondary optical signals into sensing fiber 212 and reference fiber coil 216 via optical switch 205. When optical switch 205 is in a first position, primary source 204 produces primary back-scattered signals from sensing fiber 212. When optical switch 205 is in a second position, secondary source 206 produces secondary back-scattered signals from sensing fiber 212. Optical combiner/splitter 208 directs these mixed spectral components to optical filter 220, which separates the back-scattered components into the bands of interest, which may be the Rayleigh, Raman Stokes and Raman anti-Stokes frequencies of the primary or secondary light sources and then feeds them into photo-detectors 124. Three photo detectors are shown for illustrative purposes, but more are possible. The signals from photo-detectors are fed to a programmed signal processor that outputs temperature as a function of location along sensing fiber 212. In one embodiment, the wavelength of the secondary source ($\lambda_2$) is chosen to coincide with the anti-Stokes wavelength ($\lambda_{2\_AS}$) of the primary source. This is shown in FIG. 3, shown generally by the numeral 300. If secondary source wavelength is chosen to match the anti-Stokes of the primary wavelength then the Stokes wavelength of the secondary is a close match to the primary wavelength $\lambda_1$. As discussed in more detail below in the following derivations, this configuration eliminates the need to use any Rayleigh signal for adjustments, and accurate temperature may be measured using only the Stokes and anti-Stokes signals.

The attenuation factor varies as a function of wavelength and between anti-Stokes and Stokes signals because those signals are not in the same wavelength. Furthermore, localized variation in attenuation need not be assumed to be in exponential form, and attenuation along fiber 212 may be expressed as a general function that has variables of wavelength and location, as $f(\lambda,l)$. Thus, Equation 2 may be modified as follows:

$$R(T) = \frac{I_{AS}}{I_S} = \left(\frac{\lambda_S}{\lambda_{AS}}\right)^4 \cdot \exp\left(-\frac{hc\upsilon}{kT}\right) \cdot \frac{f(\lambda_{AS}, l)}{f(\lambda_S, l)} \qquad \text{Eq. (4)}$$

This holds true as long as the Stokes and anti-Stokes signals are from the same input light source. With two input sources, we may designate their wavelengths as $\lambda_1$ for the primary source and $\lambda_2$ for the secondary source. Furthermore, by setting the wavelength of the secondary source to approximately coincide with the anti-Stokes wavelength of the primary source such that $\lambda_2=\lambda_{1\_AS}$, then the Stokes wavelength of the secondary source may approximately coincide with the input wavelength of the primary source, $\lambda_{2\_S}=\lambda_1$.

The use of the Stokes signal back-scattered from the secondary source in place of the Stokes signal back-scattered from the primary source allows Equation 4 to be modified as follows:

$$R(T) = \frac{I_{1\_AS}}{I_{2\_S}} = \frac{I_1}{I_2} \cdot \left(\frac{\lambda_{2\_s}}{\lambda_{1\_as}}\right)^4 \cdot \exp\left(-\frac{hc\upsilon}{kT}\right) \cdot \frac{f(\lambda_1, l) \cdot f(\lambda_{1\_AS}, l)}{f(\lambda_S, l) \cdot f(\lambda_{2\_S}, l)} \qquad \text{Eq. (5)}$$

$$R(T) = \frac{I_{1\_AS}}{I_{2\_S}} = \frac{I_1}{I_2} \cdot \left(\frac{\lambda_1}{\lambda_2}\right)^4 \cdot \exp\left(-\frac{hc\upsilon}{kT}\right) \cdot \frac{f(\lambda_1, l) \cdot f(\lambda_2, l)}{f(\lambda_2, l) \cdot f(\lambda_1, l)}$$

$$R(T) = \frac{I_1}{I_2} \cdot \left(\frac{\lambda_1}{\lambda_2}\right)^4 \cdot \exp\left(-\frac{hc\upsilon}{kT}\right)$$

This algebraic manipulation demonstrates that with the inventive choice of primary and secondary light sources temperature information can now be derived without having to handle differential attenuation.

In another embodiment that takes advantage of the inventive choice of primary and secondary light sources, the difference in attenuation between the Stokes signal of the primary source and the Stokes signal of the secondary source may be used as a correction factor, which may be expressed as $$\frac{I_{1\_AS}}{I_{2\_S}} = \frac{I_{1\_AS}}{I_{1\_S}} \cdot \frac{I_{1\_S}}{I_{2\_S}} \qquad \text{Eq. (6)}$$

In this manner, both the primary and secondary light sources may be used to generate a correction factor ($I_{1\_S}/I_{2\_S}$) and then a single source may be used for temperature measurement with the correction factor applied to the anti-Stokes/Stokes ratio from that source. The user can thus periodically or on demand generate a new set of correction factors using the primary and secondary sources.

The advantages of the present invention include the elegance of its configuration and ease of use. The embodiments of the present invention utilize a single additional source as the secondary source for self-calibration, as opposed to two additional sources. They use Raman scattering, not Rayleigh scattering, for performing wavelength adjustments, and require only a ratio between Stokes and anti-Stokes signals without consideration for differential attenuation to generate temperature information. Moreover, the simpler processing described herein results in more accurate and reliable temperature measurements.

To calculate the absolute temperature, the reference fiber-coil located in DTS unit (116 in FIG. 1 or 216 in FIG. 2) is maintained at a known temperature θ. Then unknown temperature T along the arbitrary section of the sensing fiber can be calculated by rearranging the above equation as, $$T = \left[\frac{1}{\theta} - \frac{k}{hc\upsilon}\ln\left(\frac{R(T)}{R(\theta)}\right)\right]^{-1} \qquad \text{Eq. (7)}$$

where R(T) and R(θ) are the back scattering ratios measured at the arbitrary section of the sensing fiber and at the reference fiber-coil respectively. The intensity terms $I_1$, $I_2$ in Equation 5 are integrated into R(T) and R(θ) in Equation 7.

Experimental Verification

Figure 4:
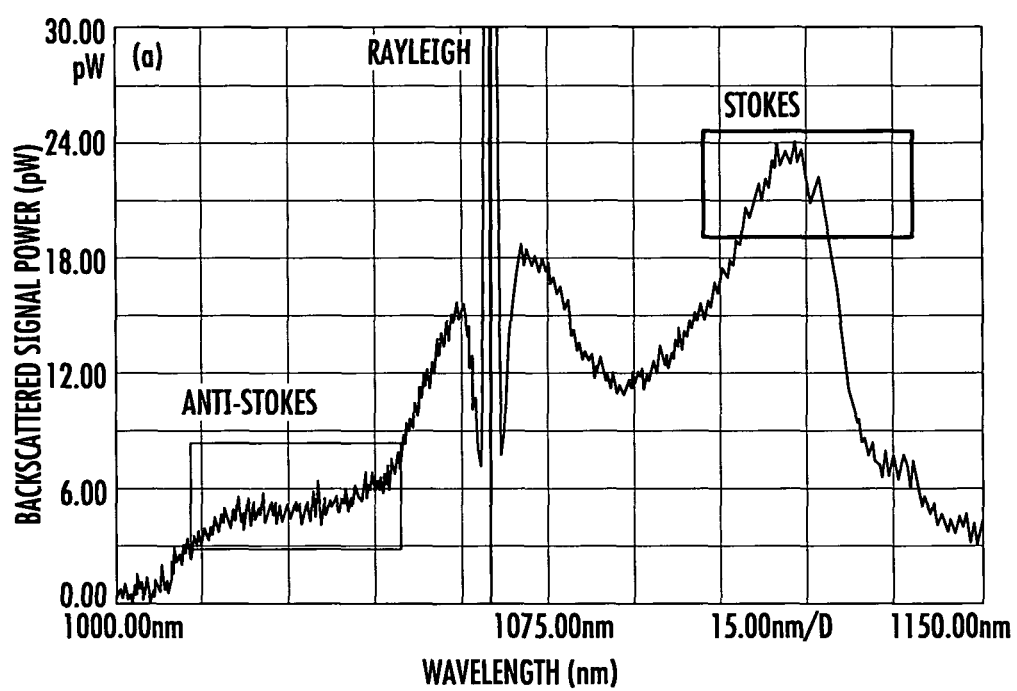
FIG. 4 illustrates a back-scattered light signal from a conventional DTS trace.
Figure 5:
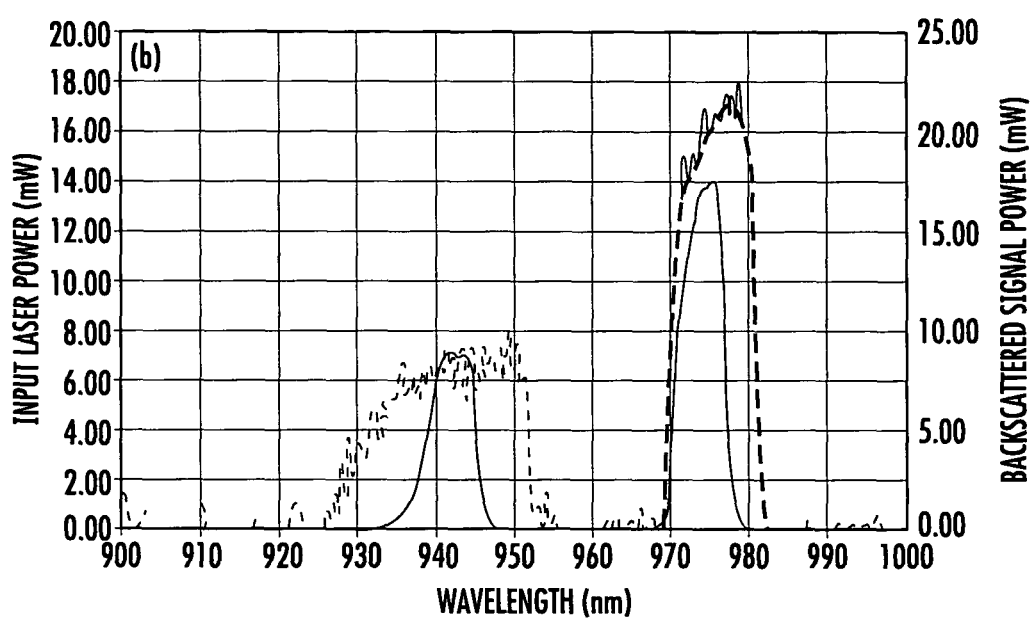
FIG. 5 illustrates a back-scattered signal from a dual light arrangement.

In an experimental set-up similar to FIG. 2 two laser sources 975 nm (primary) and 940 nm (secondary) were operated in pulse mode and selected alternatively using an optical switch, and the scattered signals collected in sequence by Si APD (Avalanche Photo-Diodes). The anti-Stokes signal is collected with 975 nm laser connection selected, while the Stokes signal is collected with the 940 nm laser selected. Back-scattered spectra of the single source system is shown in FIG. 4. and the proposed dual-source system back-scattered Raman intensities are plotted in FIG. 5. Two solid lines located at 940 nm and 975 nm indicate the Rayleigh bands of the secondary and the primary light sources. And two dotted lines containing the solid lines indicate the anti-Stokes and Stokes bands of the primary and secondary light sources respectively.

Figure 6:
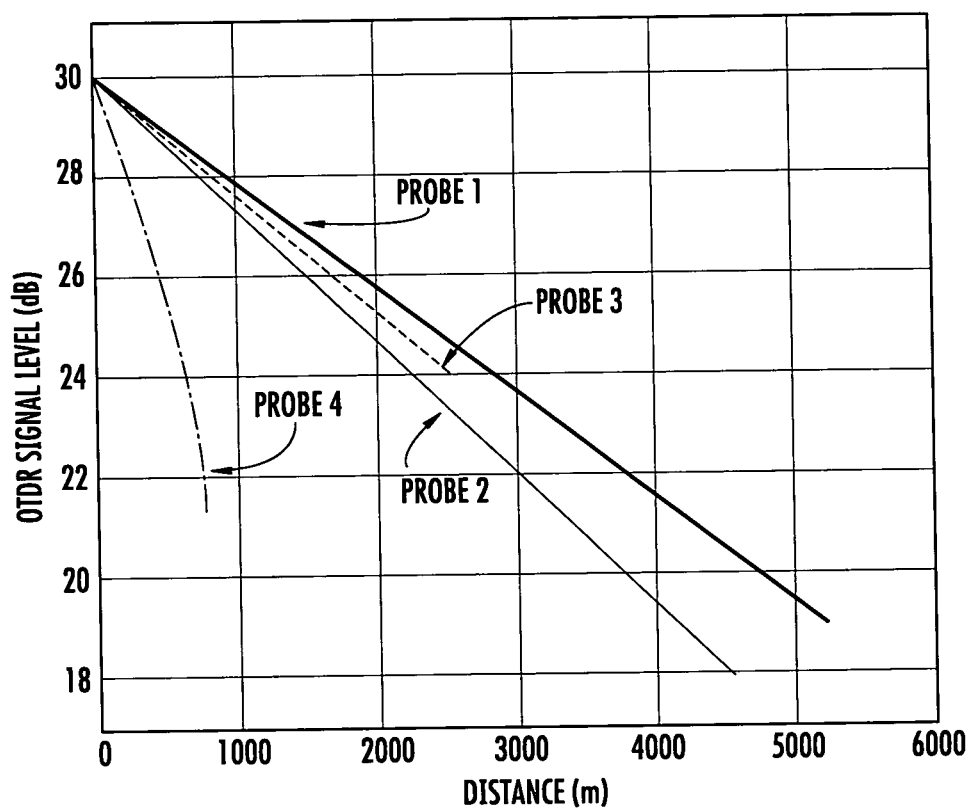
FIG. 6 illustrates the OTDR signal from four different sensing fiber probes.
Figure 7:
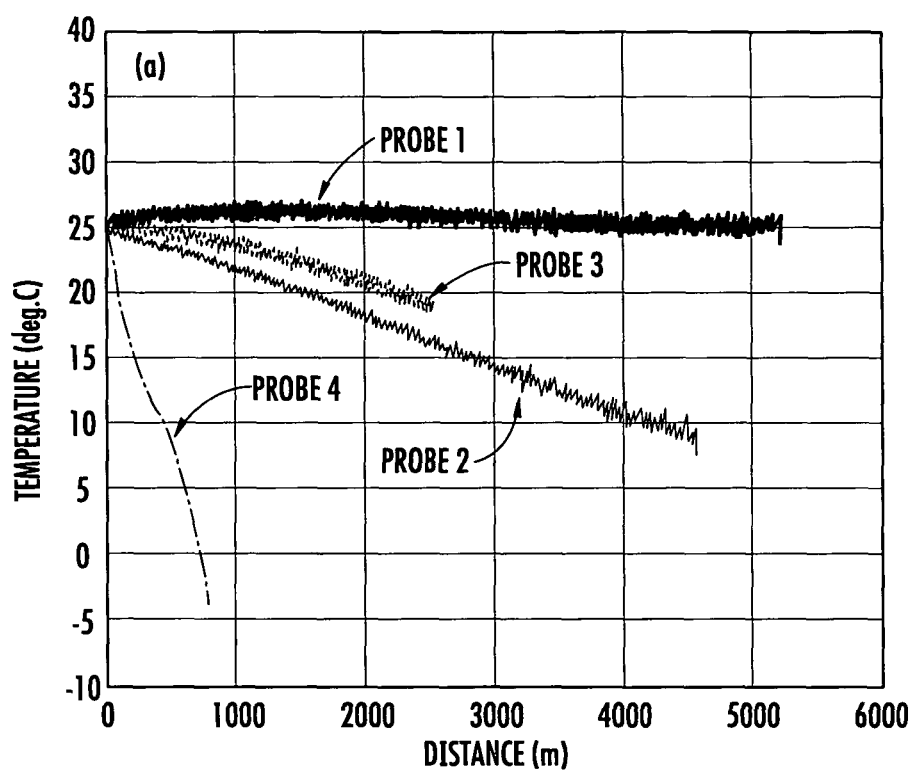
FIG. 7 illustrates the temperature measurements of the four sensing fiber probes without attention correction in a single light system.
Figure 8:
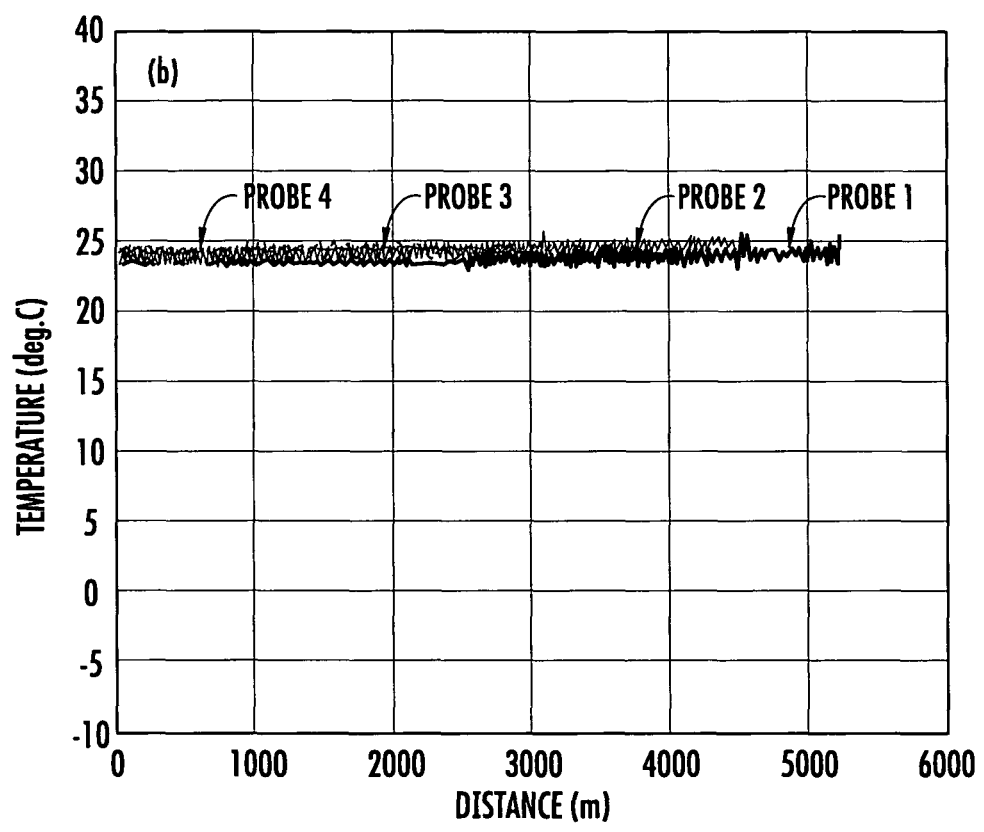
FIG. 8 illustrates temperature measurements using the dual light proposal of the present invention without attenuation adjustments.

Four different multimode fibers were used for test probes—three fibers in normal condition from different manufacturers, and one fiber that is hydrogen-darkened in an oil well (all in 50/125/250 GI MM fibers: OFS 5 km, Spectran 4.5 km, Corning 2 km and hydrogen darkened 800 m). All the fiber spools were kept under room temperature and a 30 second OTDR trace and a 2-minute temperature trace are taken with each fiber operated by regular DTS and the self-correction mode consecutively. FIG. 6 shows the comparison in OTDR traces produced by the fibers in the single source mode, which clearly show different attenuations from fiber to fiber, and it also shows locally generated non-linear attenuation in the darkened fiber (Probe 4). Then all probe fibers are connected consecutively and the temperature traces are derived without taking any actions to correct the differential attenuations. The resulting temperature profiles produced by normal single mode operation are plotted in FIG. 7. Calculation errors are evident among different fibers due to differential attenuation. However FIG. 8 shows the temperature traces measured by the dual-light auto-correction mode. These display correct temperature profiles for all fibers, independent of their inherent attenuation profiles. The dual light mode is easily programmed to be an automated system.

Although certain embodiments of the present invention and their advantages have been described herein in detail, it should be understood that various changes, substitutions and alterations can be made without departing from the spirit and scope of the invention as defined by the appended claims. Moreover, the scope of the present invention is not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufactures, means, methods or steps.

The invention claimed is:

1. A method of auto-correcting a temperature measurement using a fiber optic distributed temperature sensor system comprising the steps of:
   a. injecting primary light energy into a sensing fiber of the fiber optic distributed temperature sensor system using a primary light source;
   b. collecting back-scattered light energy at the Raman anti-Stokes wavelength of the primary light energy and measuring its intensity;
   c. injecting secondary light energy into the sensing fiber of the fiber optic distributed temperature sensor system at the Raman anti-Stokes wavelength of the primary light energy using a secondary light source;
   d. collecting back-scattered light energy at the Raman Stokes wavelength of the secondary light energy and measuring its intensity; and
   e. autocorrecting the temperature measurement using the back-scattered anti-Stokes signal intensity of the primary light energy and the back-scattered Stokes signal intensity of the secondary light energy.

2. The method of auto-correcting a temperature measurement using a fiber optic distributed temperature sensor system of claim 1 wherein said primary light source has a wavelength of about 975 nanometers and said secondary light source has a wavelength of about 940 nanometers.

3. The method of auto-correcting a temperature measurement using a fiber optic distributed temperature sensor system of claim 1 wherein said calculating step is performed without measuring or using differential attenuation profiles.

* * * * *